United States Patent [19]

Fiorini

[11] 4,160,937
[45] Jul. 10, 1979

[54] PROCESS FOR THE CONTROL OF THE FORWARD SPEED OF WORK-PIECES

[76] Inventor: Antonio Fiorini, Via Olive, 33, Montorio Veronese, Verona, Italy

[21] Appl. No.: 816,176

[22] Filed: Jul. 15, 1977

[30] Foreign Application Priority Data

Aug. 25, 1976 [IT] Italy ................................. 26515 A/76

[51] Int. Cl.² ............................ B23Q 5/10; B23Q 5/28
[52] U.S. Cl. ...................................... 318/39; 318/571; 318/634
[58] Field of Search .......................... 318/571, 39, 634; 83/367

[56] References Cited

U.S. PATENT DOCUMENTS

| 3,646,839 | 3/1972 | Shillam | 318/571 |
| 3,896,360 | 7/1975 | Meyer et al. | 318/571 |

Primary Examiner—J. V. Truhe
Assistant Examiner—Eugene S. Indyk
Attorney, Agent, or Firm—McGlew and Tuttle

[57] ABSTRACT

A machine with automatic feed speed control comprising, a work-piece advancing device for advancing a work-piece in a feed path at a feed speed, a work-piece tooling device having a tool member movable in the feed path with a portion engageably with the work-piece for tooling the work-piece and for receiving a load from the advancing work-piece through the action of the work-piece advancing device. The load is proportional to the size of the portion of the tool member engaged with the work-piece. A speed controller is connected to the work-piece advancing device for increasing and decreasing the speed thereof and thereby increasing and decreasing the feed speed of the work-piece. Work-piece sensors are provided in the feed path engageably with the work-piece for sensing the size of the portion of the tool member which will become engaged with the work-piece, which size corresponds to a maximum load on the work-piece tooling device. A transducer is connected between the work-piece advancing and tooling devices and connected to the sensors for reducing the speed of the work-piece advancing device when the maximum load set by the sensors is exceeded. Thereby, the machine always operates at full feed speed, which is reduced only when the maximum load of the tooling device is exceeded.

11 Claims, 2 Drawing Figures

PROCESS FOR THE CONTROL OF THE FORWARD SPEED OF WORK-PIECES

FIELD AND BACKGROUND OF THE INVENTION

The present invention relates to a process for the control of the forward speed of work-pieces as a function of the power absorbed from the machine-tools which are operating on the work-pieces. The invention also relates to the apparatus for carrying out the process.

In particular, but not exclusively, the process according to the present invention is particularly suitable for the control of multi-bladed saws to obtain the maximum speed of advancement compatible with the type of material which has to be sawed and with the degree of sharpness of the machine-tools.

DESCRIPTION OF THE PRIOR ART

It is known that in many machine-tools, and in particular in connection with multi-bladed saws, the "load" of the motor which activates the machine-tool varies considerably with respect to various factors among which are:

(a) the type of the material which has to be sawed;
(b) the dimensions of the material which has to be sawed (and in particular the width of the work table); and
(c) the number of blades effectively being utilized in the operation and the degree of sharpness of the blades.

Such variations in "loading" make continuous manual changes in the advancement of the work-pieces necessary and do not permit one to achieve the optimum operability of the machine and therefore the maximum productivity thereof. This particularly effects certain large scale workings in which a high degree of productivity is essential (such as, for example, in the production of wooden packing cases).

SUMMARY OF THE INVENTION

In order to solve these problems, the present invention provides a process and an automatic apparatus to regulate the speed of a motor which advances work-pieces that are being processed. The speed is calculated as a function of the load of the motor which activates the machine-tools. In particular the apparatus according to the invention provides a certain number of feelers which "feel" the width of the work table and which, as a result, determine an electronic predisposition of maximum load to the loading of the motor which activates the blades, as a function of the tools which are involved in the cutting process (which in turn is a function of the width of the table). If this maximum load is exceeded, a transductor cuts in on the operation of an advancement motor, thus reducing the load on a saw motor. In such manner it is possible to give to any machine-tool a maximum power which is not exceeded regardless of the load condition.

Accordingly, an object of the present invention is to provide a machine with an automatic feed speed control comprising, work-piece advancing means for advancing a work-piece in a feed path at a feed speed, work-piece tooling means having a tool member movable in the feed path with a portion engageable with a work-piece for tooling the work-piece and for receiving a load from the advancing work-piece proportional to the size of the portion of the tool member engaged with the work-piece, speed control means connected to said work-piece advancing means for increasing and decreasing the speed thereof and thereby increasing and decreasing the feed speed of the work-piece, work-piece sensing means in the feed path engageable with a work-piece to indicate the size of said portion of said tool member engageable with the work-piece which corresponds to a maximum load on said work-piece tooling means, and means connected between said work-piece tooling and work-piece advancing means and connected to said work-piece sensing means for reducing the speed of said work-piece advancing means when the maximum load determined by said work-piece sensing means is exceeded.

Another object of the present invention is to provide a method for automatically controlling the feed speed of a machine comprising, feeding a work-piece in a feed path at a feed speed, providing a tooling device having a tool member movable in the feed path with a portion thereof engageable with the work-piece for tooling the work-piece and for receiving a load from the advancing work-piece proportional to the size of the portion of the tool member engaged with the work-piece, sensing the size of the portion of the tool member engageable with the work-piece corresponding to a maximum load on the tooling device, and reducing the feed speed of the work-piece in the feed path when the maximum admissible load is exceeded.

A further object of the present invention is to provide a machine with automatic feed speed control which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
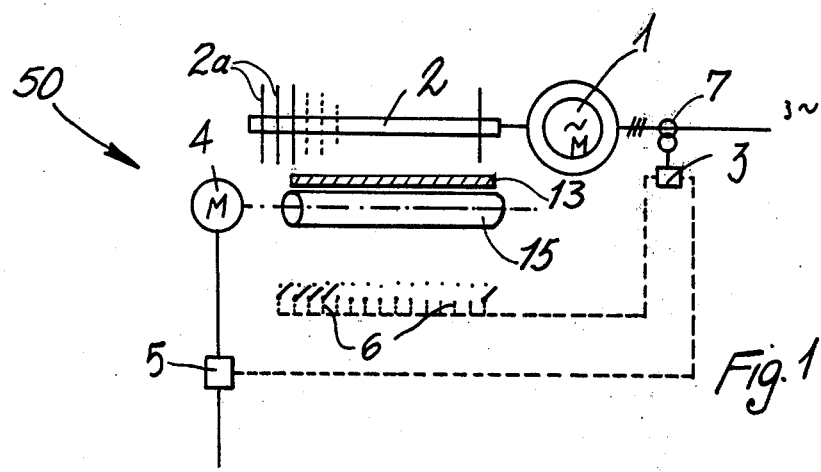
FIG. 1 shows the block electronic scheme of the apparatus of the present invention.

Referring now to the drawings in particular, the invention embodied therein comprises a machine generally designated 50 having automatic feed speed control which includes a work-piece advancing means in the form of a motor 4 which rotates an advancing roller 15 to move a work-piece 13 in a feed path at a feed speed. A work-piece tooling means, here in the form of a motor 1 which rotates a shaft 2, is provided having a tool member movable in the feed path here shown in the form of a plurality of blades 2a which are engageable with the work-piece for tooling the work-piece and being exposed to a load or movement resistance by virtue of the engagement of the tool member with the advancing work-piece. It can be understood that the tooling to be done can be either milling, cutting, gouging, or any other working or modification of the work-piece 13 which exposes the motor 1 to a negative load. The resistance or load on the motor 1 is also proportional to the size of the tool member engaged with the work-piece, which here corresponds to the number of blades 2a which are engaged with a particular size of work-piece 13. Speed control means are connected to the motor 3 generally shown as a controller 5 in FIG. 1 and as a transformer winding 18 in FIG. 2. Such speed controllers are generally known in the field. A work-piece sensing means is provided in the feed-path of the work-piece and thereby determining the size or portion of the tool member exemplified by 2 and 2a, will become engaged with the workpiece 13. This portion or size of the tool member corresponds with a known maximum load which will be applied to the work-piece tooling means. Means are also connected between the workpiece tooling means exemplified by motor 1 with shaft 2 and a power line 7, and the work-piece advancing means exemplified by the motor 4 and speed controller 5 for reducing the speed of the work-piece advancing means when the maximum load determined by the work-piece sensing means 6 is exceeded.

The invention is now described more specifically and in greater detail.

In FIG. 1 there is indicated a driving motor 1 for rotating a series of blades 2a mounted on axle 2. Motor 1 is powered by three phase A.C. through a line 7. A motor 4 is preferably operable on direct current, and effects the advancement of roller 15 which engages a work-piece 13 to advance the work-piece.

Figure 2:
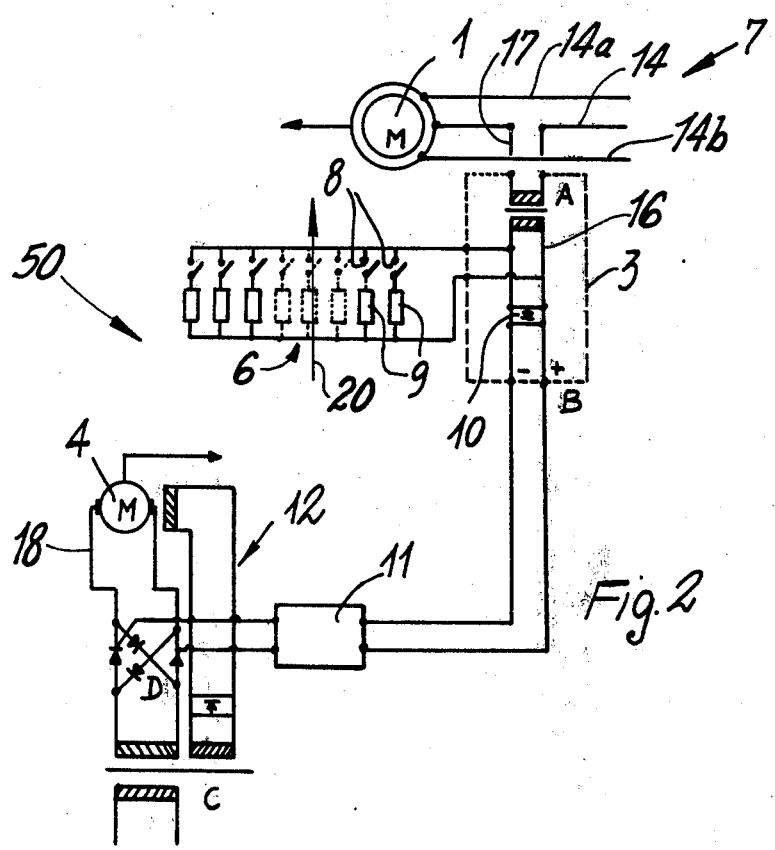
FIG. 2 shows the same scheme of FIG. 1 in a more detailed manner.

According to the invention, there is provided an electronic current/tension transducer 3 which is inserted on the feed line 14 for motor 1 (see FIG. 2). Lines 14a and 14b complete the three phase power line 7.

The transducer 3 is connected to a series of feelers or sensors 6 which, as before stated, "feel" the width of the work-piece 13 or a work table coresponding in width to the work-piece but not shown. In the scheme of FIG. 1 there is indicated an electronic control device 5 of a motor 4 which serves to advance the work-piece by rotating a feed roller 15.

As can be better seen in FIG. 2, the feelers or sensors 6 practically consist of a plurality of switches 8, connected in parallel with each other, each one connected in series with a resistor 9. These switches can be of any known type and particularly mechanic, magnetic, optical, capacitive, or the like. The switches 8, in accordance with the invention, extend into the feed path indicated at arrow 20 of the work-piece 13 and, depending on the width of the work-piece across the feed path, a certain number of switches 8 will be closed leaving the remainder which are untouched by the moving work-piece 13 open. The feelers or sensors 6, connected in parallel among each other, are connected in parallel to a secondary winding 16 of a current transformer A, the primary 17 of which is connected to the feeding wire 14 for motor 1. On the secondary 16 of transformer A there is provided a rectifier 10 such that on the exit terminal B of the transducer there is furnished a D.C. current proportional to the current absorbed by the motor 1 which rotates blades 2, this current tension being exactly proportional to the number of closed switches 8 and therefore being also proportional to the width of the work table. The tension present at the terminals B is then transferred to a device forming impulses and modification which, with the exit impulses thereof, controls a semi-controlled bridge D connected to the secondary 18 of a feeding transformer C for variable speed motor 4. At C there is also provided a standard excitement circuit for the A.C. motor 4. This circuit is indicated in its entirety as 12. As is apparent from the above description, the feelers or sensors 6 automatically set the transducer 3 as a function of the width of the table and consequently as a function of the number of blades used in the particular operation. There is therefore an electronic presetting of the maximum load bearable by the saw motor, wherein, if much load is exceeded, transducer 3, by means of the impulse and amplification formation circuit 11 and of the semi-controlled bridge D regulates the speed of variable-speed motor 4 and consequently the advancement roller 15 and therefore the advancement speed of the table or of the work-piece which coincide therewith. When the load of motor 1 exceeds the preestablished value there is therefore an automatic slow-down of motor 4, with the resulting diminution of said load. This results in bringing the machines automatically to operate in their optimum operating conditions.

As is evident from what has been described above, a machine equipped with the apparatus of the present invention will have a lower operating cost, a higher work safety and a maximum advancement speed, compatible with the quality of the material to be worked and with the degree of sharpness of the machine-tools, with the possibility of operating with tables having various widths, without need of manually presetting the advancements.

While a specific embodiment of the invention has been shown and described in detail to illustrate the application of the principles of the invention, it will be understood that the invention may be embodied otherwise without departing from such principles.

What is claimed is:

1. A method for automatically controlling the feed speed of a motor comprising, advancing a work-piece in a feed path at a feed speed, providing a tooling device having a tool member movable in the feed path with a portion engageable with a work-piece for tooling the work-piece and for receiving a negative load from the advancing work-piece which is proportional to the size of the portion of the tool member engaged with the work-piece, sensing the size of the portion of the tool member engageable with the work piece which corresponds with a maximum load admissible on the tooling device, and reducing the feed speed of the work-piece in the feed path when the maximum load determined by the sensing of the portion of the tool member engaged with the work-piece is exceeded.

2. A machine with automatic feed speed control comprising, work-piece advancing means for advancing a work-piece in a feed path at a feed speed, work-piece tooling means having a tool member movable in the feed path with a portion engageable with the work-piece for tooling a work-piece and for receiving a load from the advancing work-piece proportional to the size of the portion of said tool member engaged with the work-piece, speed control means connected to said work-piece advancing means for increasing and decreasing the speed of said work-piece advancing means to increase and decrease the feed speed of the work-piece in the feed path, work-piece sensing means in the feed path engageable with the work-piece to sense the size of the portion of said tool member engageable with the work-piece which corresponds to a maximum load on said work-piece tooling means, and means connected between said work-piece tooling means and said work-piece advancing means and connected to said work-piece sensing means for reducing the speed of said work-piece advancing means when said maximum load determined by said work-piece sensing means is exceeded.

3. A machine according to claim 2 wherein said means connected between said work-piece advancing means and said work-piece tooling means comprises a current/tension transducer, said work-piece tooling means including a tooling motor having a line adapted to be connected with a source of electricity, said transducer connected to said line, said sensing means comprising a plurality of feelers disposed across said feed path for producing an electric signal corresponding with the maximum load for the tooling motor, said transducer being connected to said work-piece advancing means and to said feelers, wherein when an actual load on said tooling motor exceeds said maximum load produced by said signal from said feelers, said work-piece advancing means speed is reduced.

4. A machine according to claim 3 wherein said advancing means comprises an advancing motor connected to an advancing roller for engaging a work-piece and advancing it in said work path.

5. A machine according to claim 3 wherein said current/tension transducer comprises a transformer having a primary winding connected to said line on said tooling motor and a secondary winding connected to said feelers, said speed control means connected to said work-piece advancing means comprising a semi-controlled bridge, the secondary winding of said transducer connected to said semi-controlled bridge for controlling the speed of said work-piece advancing means.

6. A machine according to claim 3 wherein said feelers are connected in parallel with each other and each comprises a switch connected in series with a resistor, said switches being disposed across said feed path, a number of said switches engageable by a work-piece advancing along said feed path, said number of switches engaged corresponding with the size of the portion of said tool member in said feed path.

7. A machine according to claim 6 wherein said tooling member comprises a plurality of cutting blades disposed across said feed path, the number of switches closed by said advancing work-piece corresponding with the number of blades engaged with said work-piece.

8. A machine according to claim 6 wherein said transducer comprises a transformer having a primary winding connected to the power line of said tooling motor and a secondary winding connected to said parallel connected feelers.

9. A machine according to claim 8 wherein said transducer further includes a D.C. rectifier for forming impulses when the actual load on said work-piece tooling means exceeds said load determined by said sensing means, and an amplifier for amplifying said impulses connected between said transducer and said speed control means.

10. A machine according to claim 9 wherein said speed control means comprises a semi-controlled bridge connected to said work-piece advancing means.

11. A machine with automatic feed speed control comprising, a work-piece advancing motor, a work-piece advancing roller connected to said work-piece advancing motor engageable with a work-piece for advancing it at a feed speed in a feed path, said advancing motor comprising a direct current motor having a power supply connected thereto, a semi-controlled bridge connected in said power supply of said advancing motor for controlling the speed thereof, a tooling motor, a tooling member connected to and rotatable by said tooling motor comprising a shaft and a plurality of axially aligned blades thereon extending in said feed path, a power line connected to said tooling motor, a transducer comprising a transformer having a primary winding connected to said power line of said tooling motor and a secondary winding, a plurality of sensors connected in parallel with each other and with said secondary winding of said transformer, each sensor comprising a sensing switch in series with a resistor, a rectifier in said secondary winding of said transformer, said secondary winding of said transformer connected to said semi-controlled bridge, said sensing switches extending across said feed path, whereby a work-piece advanced in said feed path closes a number of said sensing switches corresponding to the number of blades engaged with said work-piece for producing an impulse corresponding with a maximum load appliable to said tooling motor, said advancing motor being reduced in speed through said semi-controlled bridge by said transducer when an actual load on said tooling motor exceeds said maximum load determined by said plurality of closed sensing switches.

* * * * *